United States Patent
Hsu et al.

(10) Patent No.: US 10,081,118 B2
(45) Date of Patent: Sep. 25, 2018

(54) FENCE ASSEMBLY FOR MITER SAW

(71) Applicant: REXON INDUSTRIAL CORP., LTD., Taichung (TW)

(72) Inventors: Chih-Chin Hsu, Taichung (TW); Hung Jung Chiang, Taichung (TW); Wen Chin Chiang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 1 day.

(21) Appl. No.: 15/293,332

(22) Filed: Oct. 14, 2016

(65) Prior Publication Data

US 2017/0106558 A1 Apr. 20, 2017

(30) Foreign Application Priority Data

Oct. 15, 2015 (TW) .............................. 104133886 A

(51) Int. Cl.
| | |
|---|---|
| B27B 27/08 | (2006.01) |
| B23D 47/04 | (2006.01) |
| B27B 27/06 | (2006.01) |
| B23D 45/02 | (2006.01) |
| B27B 27/10 | (2006.01) |

(52) U.S. Cl.
CPC ............ *B27B 27/06* (2013.01); *B23D 45/024* (2013.01); *B27B 27/08* (2013.01); *B27B 27/10* (2013.01); *B23D 47/04* (2013.01)

(58) Field of Classification Search
CPC ....... B27B 27/00–27/10; B23D 45/024; B23D 45/044–45/048; B23D 47/025; B23D 47/04; B23D 47/06; Y10T 83/7593; Y10T 83/7607; Y10T 83/7613; Y10T 83/762; Y10T 83/7633; Y10T 83/764; Y10T 83/7647; Y10T 83/7693; Y10T 83/7697; Y10T 83/8773; B26D 7/01; B26D 7/02
USPC ........... 83/467.1, 468.1, 468.2, 468.3, 468.5, 83/468.6, 468.7, 471.2, 471.3, 581; 144/286.1, 286.5, 287, 253.1, 253.5, 144/253.8; 269/303, 304, 315, 318, 319; D15/133, 140, 141
See application file for complete search history.

(56) References Cited

U.S. PATENT DOCUMENTS

| | | | | |
|---|---|---|---|---|
| 4,817,693 | A | * | 4/1989 | Schuler ................ B23D 47/025 144/117.1 |
| 5,768,966 | A | * | 6/1998 | Duginske ................ B27B 25/10 144/253.1 |

(Continued)

*Primary Examiner* — Stephen Choi
*Assistant Examiner* — Evan MacFarlane
(74) *Attorney, Agent, or Firm* — Bacon & Thomas, PLLC

(57) ABSTRACT

A fence assembly for miter saw includes a mounting base defining a first abutting surface, and a fence unit mounted at the mounting base in one of first, second and third positions in such a manner that the second abutting surface of the fence unit is disposed co-planar with the first abutting surface of the mounting base when the fence unit is set in the first position; the third abutting surface of the fence unit is disposed in a non-coplanar relationship with the first abutting surface of the mounting base to face toward the same direction when the fence unit is set in the second position; the fourth abutting surface of the fence unit is disposed in a non-coplanar relationship with the first abutting surface of the mounting base to face toward the same direction when the fence unit is set in the third position.

6 Claims, 7 Drawing Sheets

(56) References Cited

U.S. PATENT DOCUMENTS

| | | | | |
|---|---|---|---|---|
| 2006/0266182 A1* | 11/2006 | Balolia | ................... | B27B 27/02 83/471.3 |
| 2012/0098183 A1* | 4/2012 | Sharp | ....................... | B23Q 3/00 269/315 |
| 2012/0167738 A1* | 7/2012 | Lawlor | .................. | B23D 47/04 83/471.3 |
| 2012/0248675 A1* | 10/2012 | Harder | ................. | B23Q 16/001 269/315 |

* cited by examiner

FENCE ASSEMBLY FOR MITER SAW

BACKGROUND OF THE INVENTION

1. Field of the Invention

The present invention relates to miter saw technology and more particularly, to a fence assembly for use in a miter saw.

2. Description of the Related Art

When using a miter saw to cut a workpiece, the user will place the workpiece on the worktable to abut the workpiece against a fence, enabling the workpiece to be supported in position by the fence and avoiding displacement of the workpiece during the cutting operation.

In a conventional miter saw, the fence is affixed to the supporting base and not adjustable to change the position according to actual cutting requirements. Subject to the limitation of the position of the fence, the saw arm can simply be moved within a predetermined stroke, resulting in a limitation on the cutting stroke.

SUMMARY OF THE INVENTION

The present invention has been developed in view of the prior art limitations. It is one of the main objects of the present invention to provide a fence assembly for a miter saw, which allows adjustment of the position of the fence according to actual cutting requirements of the workpiece, which solves the problem of a limited cutting stroke.

To achieve this and other objects of the present invention, a fence assembly comprises a mounting base and a fence unit. The mounting base mounted at a supporting base, comprising a first abutting surface that extends perpendicular to the first work surface of the supporting base. The fence unit is able to be detachably mounted at the mounting base and turnable relative to the mounting base between a first position, a second position and a third position. The fence unit comprises a second abutting surface, a third abutting surface that extends perpendicular to the second abutting surface, and a fourth abutting surface located on a back side of the second abutting surface. The second abutting surface is disposed perpendicular to the first work surface of the supporting base and coplanar with the first abutting surface of the mounting base when the fence unit is set in the first position. At this time, the first abutting surface of the mounting base and the second abutting surface of the fence unit provide support to the workpiece to be cut. The third abutting surface of the fence unit is disposed perpendicular to the first work surface of the supporting base and in a non-coplanar relationship with the first abutting surface of the mounting base when the respective said fence unit is set in the second position. At this time, simply the third abutting surface of the fence unit provides support to the workpiece to be cut. The fourth abutting surface is disposed non-coplanar with the first abutting surface of the mounting base to face toward the same direction when the fence unit is set in the third position. At this time, simply the fourth abutting surface of the fence unit provides support to the workpiece to be cut.

Thus, the position of the fence unit of the fence assembly can be adjusted according to actual cutting requirements of the workpiece. When the fence unit is set in the first position, a saw arm of the miter saw can maintain its original cutting stroke. When the fence unit is set in the second position, the gap between the third abutting surface of the fence unit and the first abutting surface of the mounting base is used to increase the cutting stroke of the saw arm of the miter saw, making the miter saw practical for cutting a relatively thinner workpiece. When the fence unit is set in the third position, the gap between the fourth abutting surface of the fence unit and the first abutting surface of the mounting base is used to increase the cutting stroke of the saw arm of the miter saw, making the miter saw practical for cutting a relatively thicker workpiece.

Other and further advantages and features of the present invention will be understood by reference to the following specification in conjunction with the accompanying drawings.

DETAILED DESCRIPTION OF THE INVENTION

Figure 1:
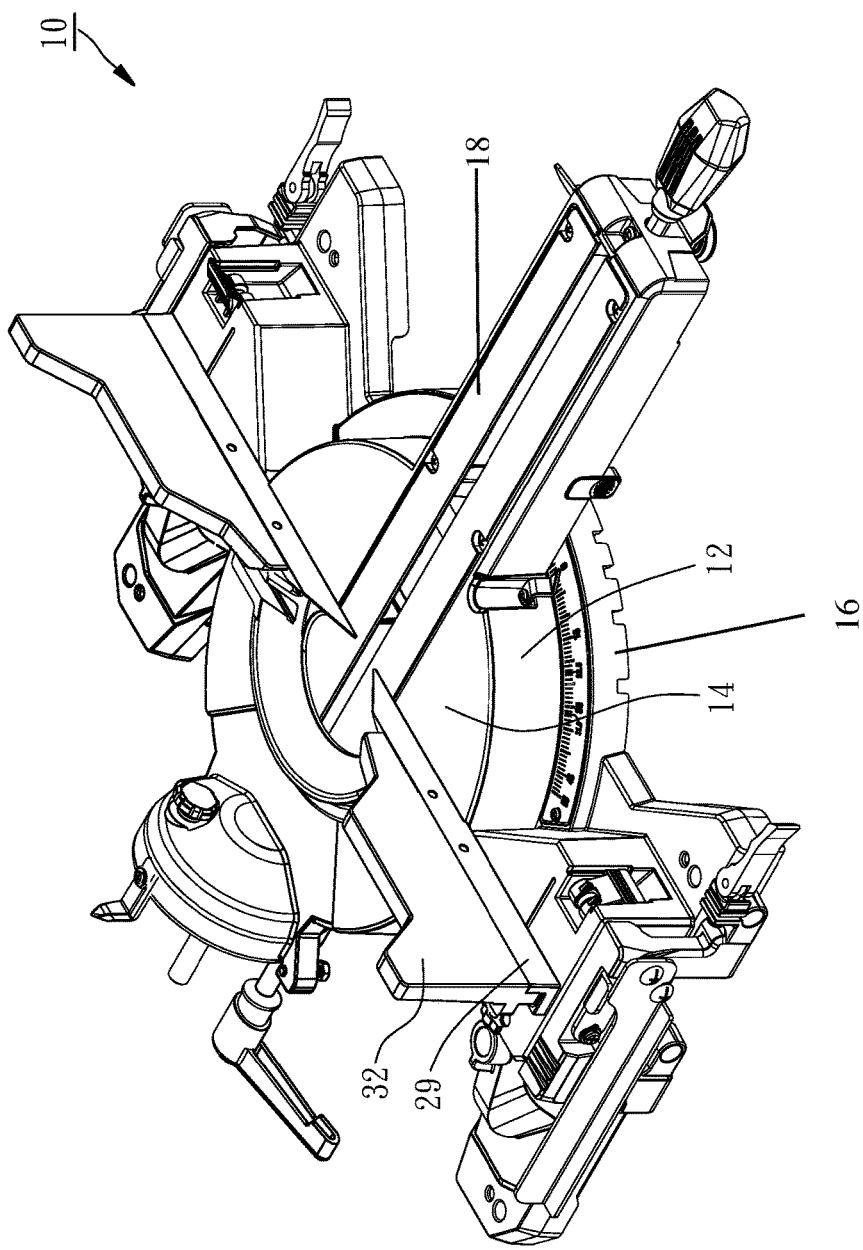
FIG. 1 is a perspective view, illustrating a fence assembly installed in a miter saw worktable in accordance with the present invention.

Referring to FIG. 1, a fence assembly 10 in accordance with the present invention is shown used in a miter saw that comprises a supporting base 16, and a worktable 12 rotatably supported on the supporting base 16. The supporting base 16 comprises a first work surface 18. The worktable 12 comprises a second work surface 14 coplanar with the first work surface 18. The first work surface 18 and the second work surface 14 are adapted for supporting a workpiece (not shown). Because the miter saw (not shown) is of the known machine tool and not within the scope of the present invention and in order to save space, the structural details and operating principle of the miter saw will not be discussed here.

Referring to FIGS. 2-6, the fence assembly 10 comprises a mounting base 20 and two fence units 30.

The mounting base 20 is affixed, e.g., attached by bolting, screwing, welding, gluing, or other means known in the art, to the supporting base 16 and bridging over the second work surface 14 of the worktable 12, comprising two mounting parts 21 and an arched connection part 22 connected between the two mounting parts 21. Each mounting part 21 defines a bottom wall 23, a first upright wall 24 and a second upright wall 26. The first upright wall 24 and the second upright wall 26 are respectively connected to the bottom wall 23, for example, to the top surface or the side surface of the bottom wall in a known manner. Thus, the bottom wall 23, the first upright wall 24 and the second upright wall 26 defines a retaining groove 27. Further, the first upright wall 24 defines a first abutting surface 29 that extends perpendicular to the first work surface 18. The second upright wall 26 defines therein a locating hole 261 in communication with the retaining groove 27

Each fence unit 30 comprises an abutment portion 31. The abutment portion 31 defines a second abutting surface 32 on a front side thereof, a third abutting surface 33 on a bottom side thereof, and a fourth abutting surface 34 on a back side thereof. Thus, the third abutting surface 33 extends perpendicular to the second abutting surface 32; the fourth abutting surface 34 is located on a back side of the second abutting surface 32. Each fence unit 30 further comprises a first engaging portion 35 and a second engaging portion 36. The first engaging portion 35 is connected to the bottom side of the abutment portion 31, defining a first bearing surface 37 on a front side thereof. The first bearing surface 37 extends perpendicular to the third abutting surface 33 of the abutment portion 31. The second engaging portion 36 is connected to the back side of the abutment portion 31, defining a second bearing surface 38 on a top side thereof. The second bearing surface 38 extends perpendicular to the fourth abutting surface 34 of the abutment portion 31.

Figure 3:
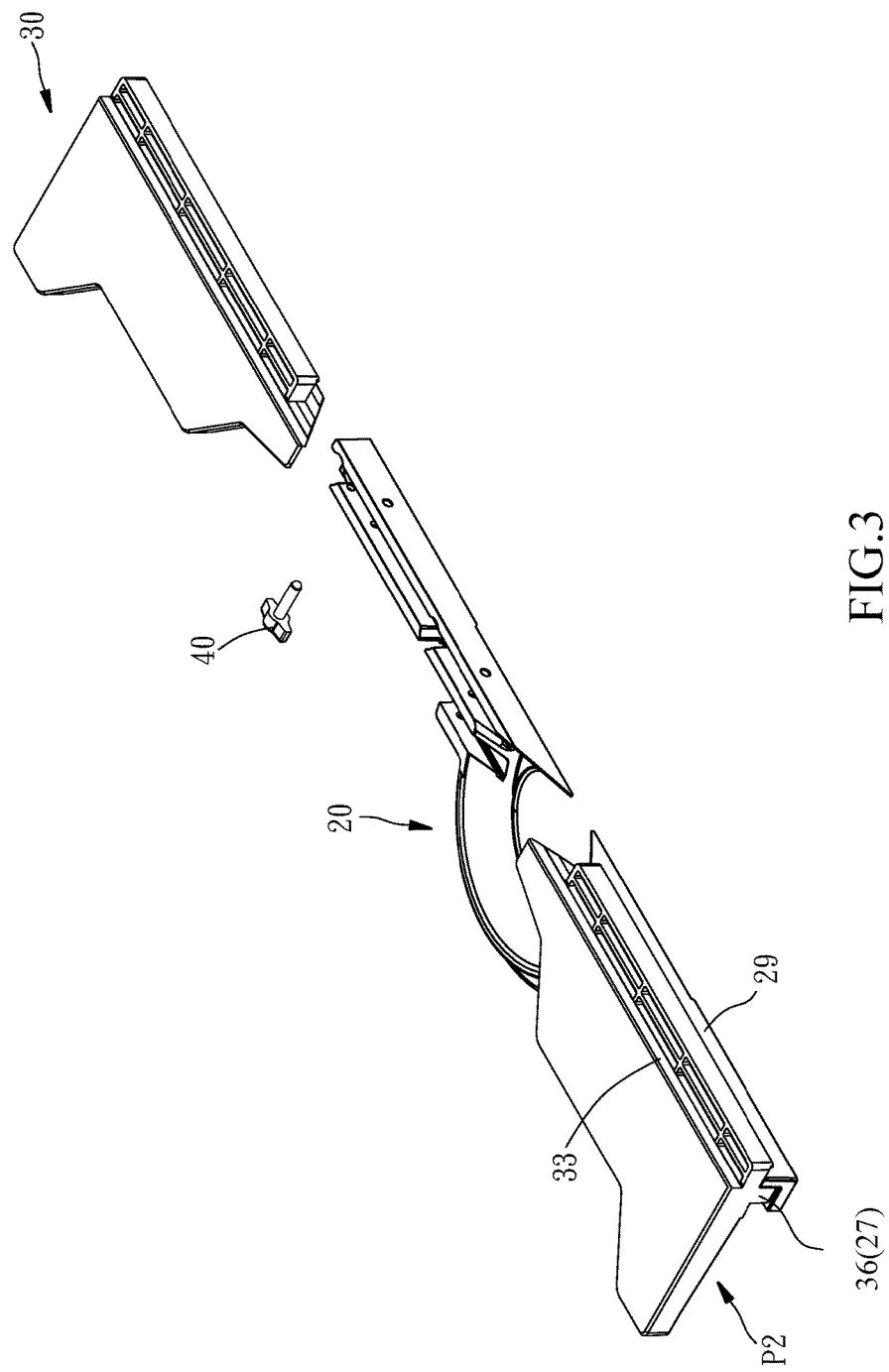
FIG. 3 is an exploded view of a part of the present invention, illustrating the fence unit in the second position.
Figure 4:
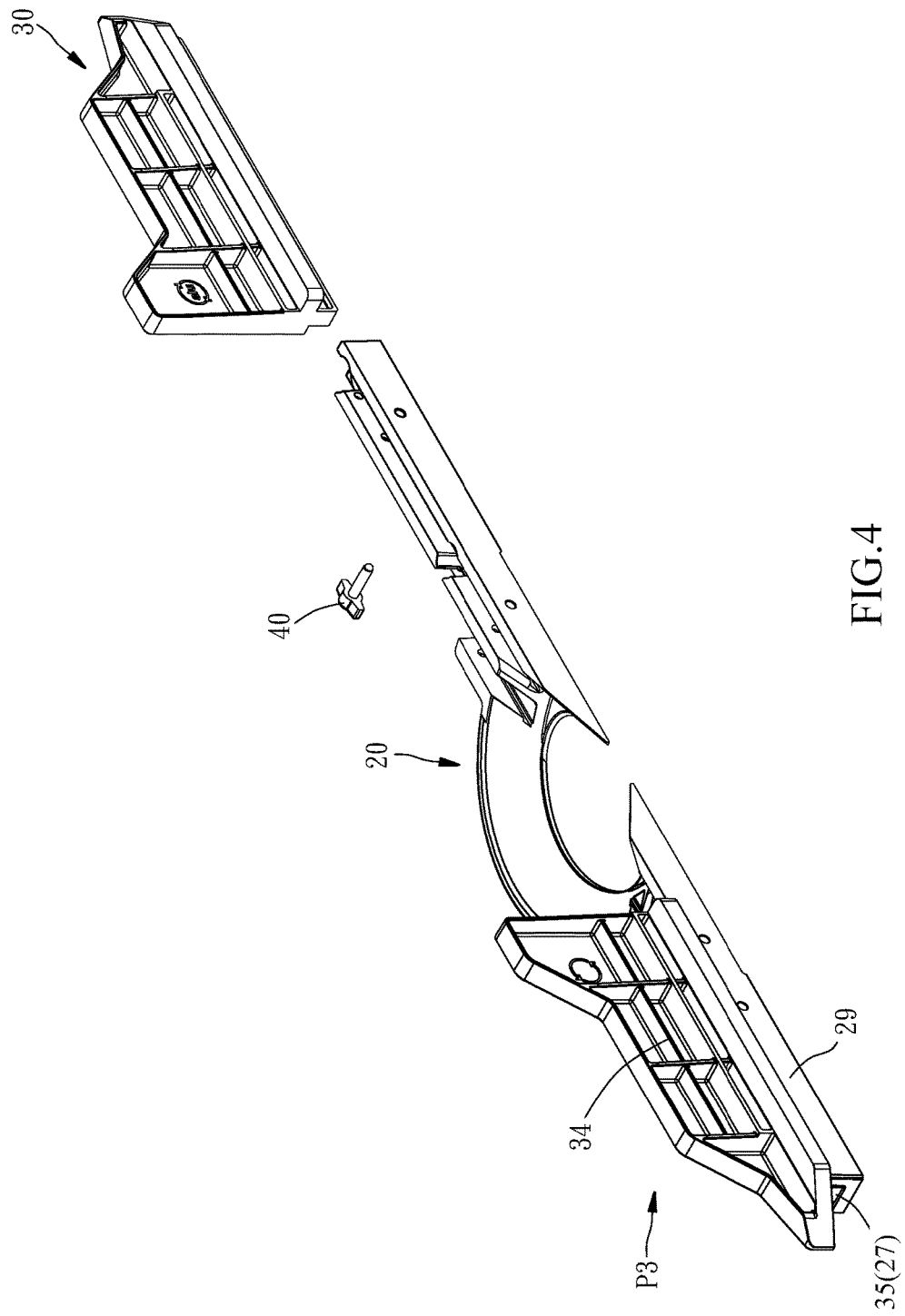
FIG. 4 is similar to FIG. 3, illustrating the fence unit in the third position.
Figure 5:
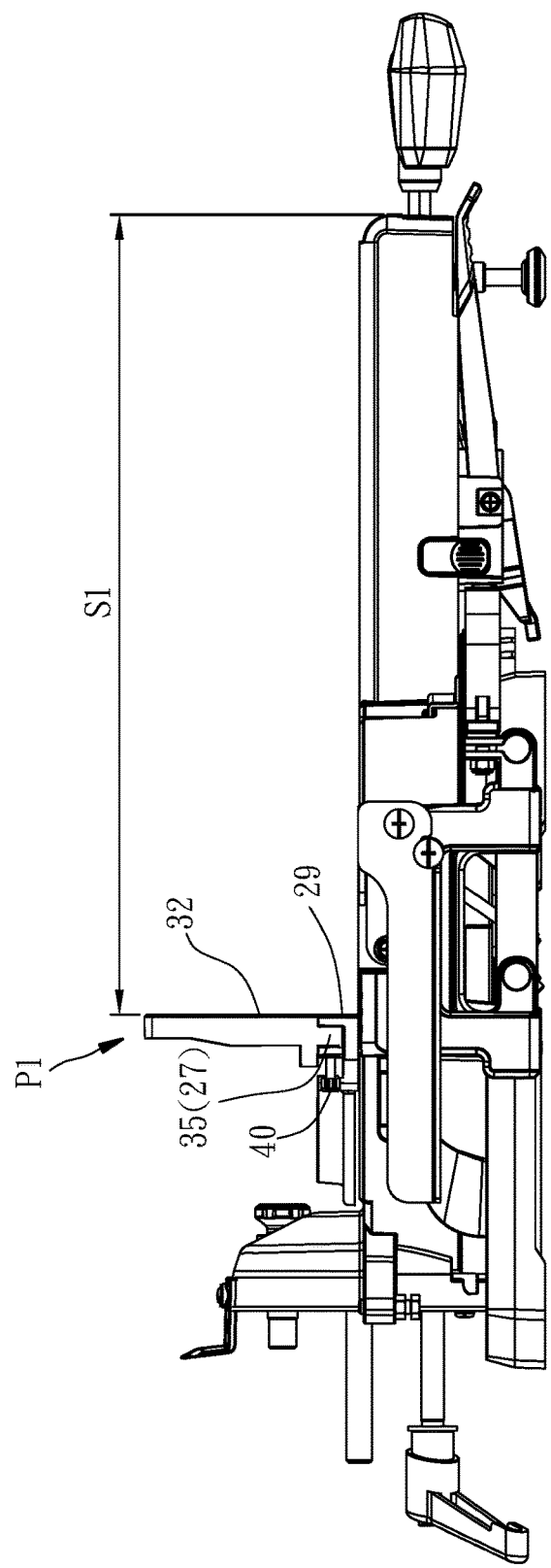
FIG. 5 is a side view of the present invention, illustrating the fence unit in the first position.
Figure 6:
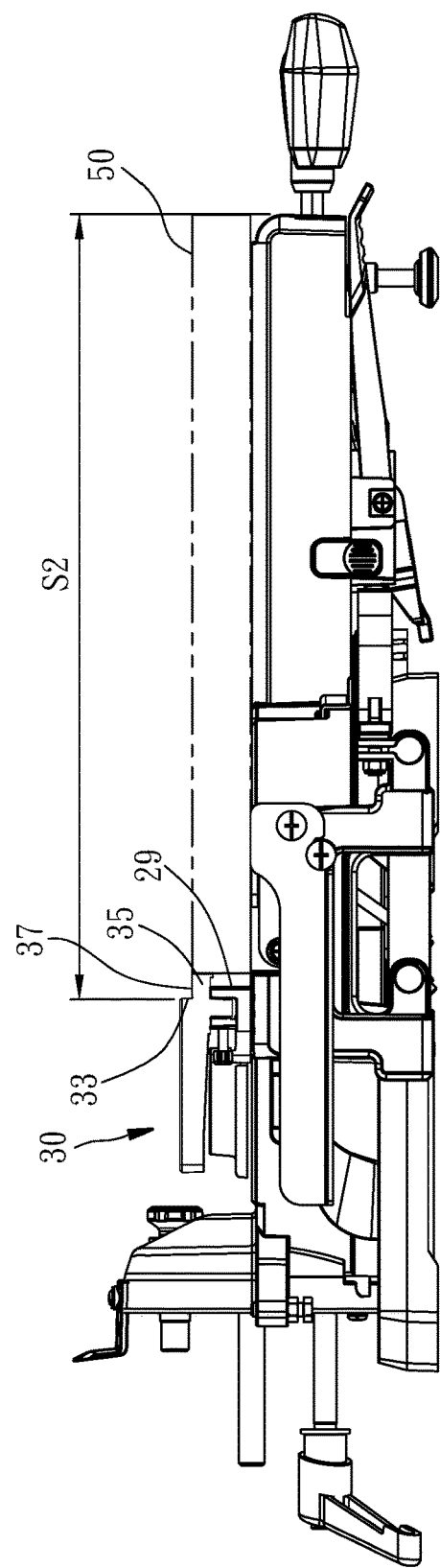
FIG. 6 is similar to FIG. 5, illustrating the fence unit in the second position.
Figure 7:
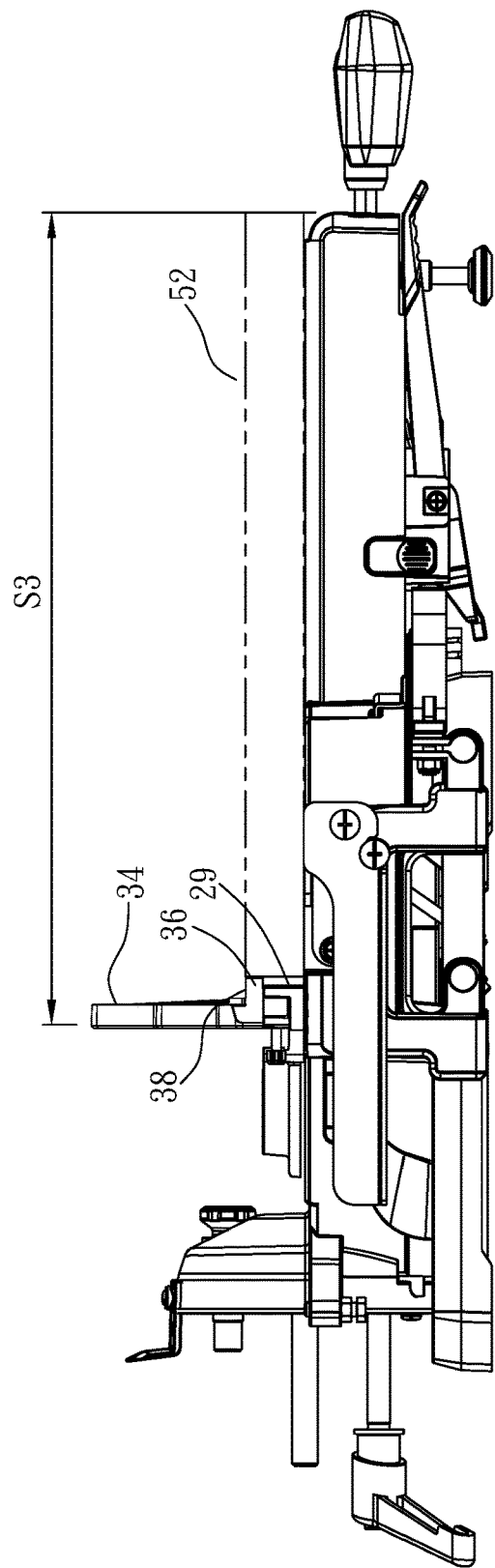
FIG. 7 is similar to FIG. 5, illustrating the fence unit in the third position.

When the fence unit 30 is in a first position P1, as shown in FIG. 5, the first engaging portion 35 of the fence unit 30 is engaged into the retaining groove 27 of the mounting part 21. At this time, the second abutting surface 32 of the fence unit 30 is disposed perpendicular to the first work surface 18 of the supporting base 16 and maintained coplanar with the first abutting surface 29 of the mounting base 20. When the fence unit 30 is in a second position P2, as shown in FIG. 3 and FIG. 6, the second engaging portion 36 of the fence unit 30 is engaged into the retaining groove 27 of the mounting part 21. At this time, the third abutting surface 33 of the fence unit 30 extends perpendicular to the first work surface 18 of the supporting base 16 in a non-coplanar relationship with the first abutting surface 29 of the mounting base 20. When the fence unit 30 is in a third position P3, as shown in FIG. 4 and FIG. 7, the first engaging portion 35 of the fence unit 30 is engaged into the retaining groove 27 of the mounting part 21. At this time, the fourth abutting surface 34 of the fence unit 30 is disposed in a non-coplanar relationship with the first abutting surface 29 of the mounting base 20 to face toward the direction toward which the first abutting surface 29 of the mounting base 20 faces. When the fence unit 30 is in a third position P3, the fourth abutting surface 34 and the first abutting surface 29 are substantially kept in parallel.

Figure 2:
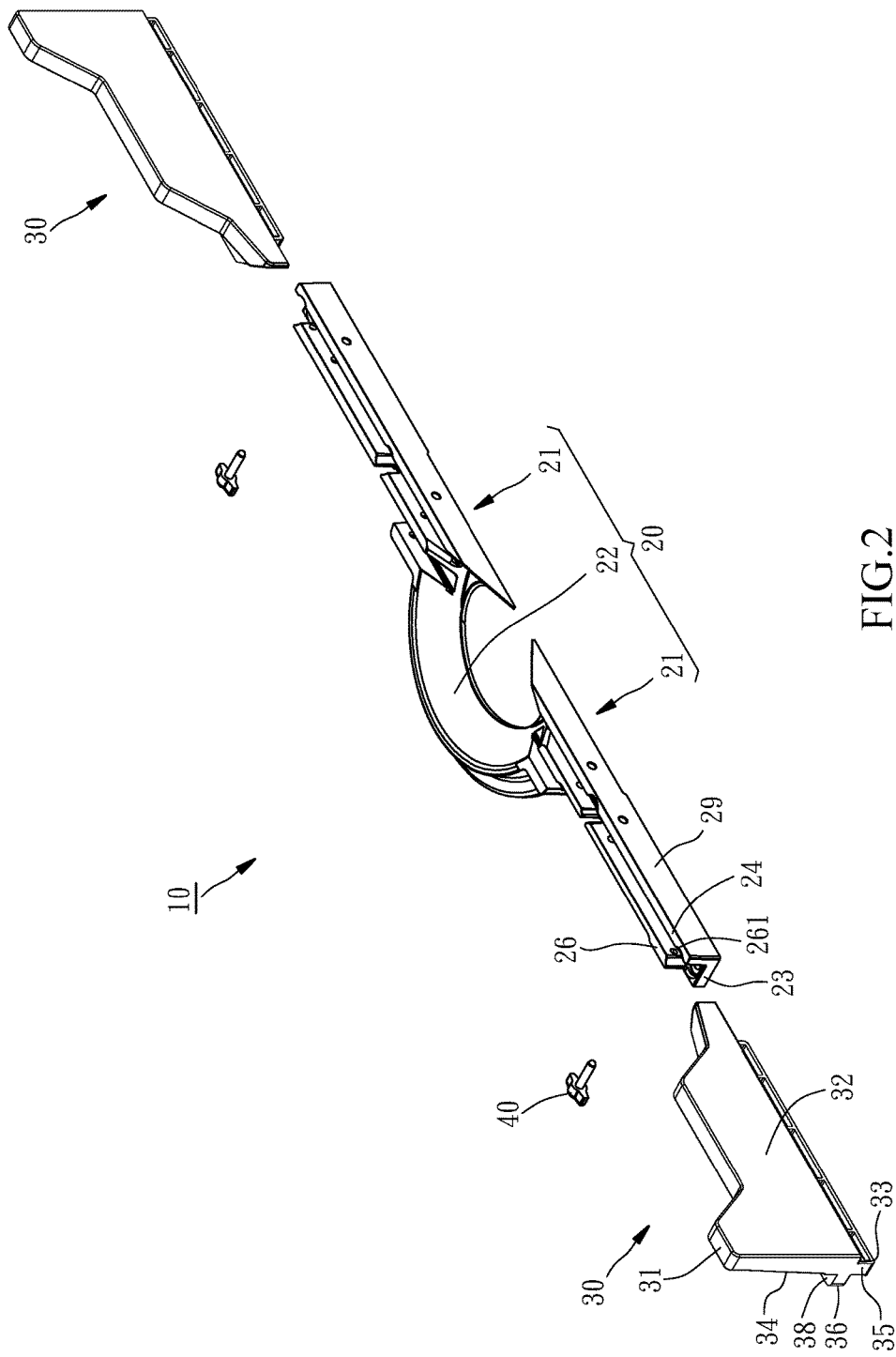
FIG. 2 is an exploded view of the fence assembly in accordance with the present invention.

As illustrated in FIGS. 2-4, when the fence unit 30 is set in the first position P1, a locking member 40 (for example, lock screw bolt) is installed to lock the fence unit 30 in the first position P1. At this time, the locking member 40 is threaded into the locating hole 261 with the distal end thereof stopped against the back side of the first engaging portion 35 of the fence unit 30, forcing the engaging portion 35 of the fence unit 30 to abut against the first upright wall 24 of the mounting base 20 firmly. When the fence unit 30 is set in the second position P2, the locking member 40 is threaded into the locating hole 261 with the distal end thereof stopped against the second bearing surface 38 of the second engaging portion 36 of the fence unit 30, forcing the second engaging portion 36 of the fence unit 30 to abut against the first upright wall 24 of the mounting base 20 firmly. When the fence unit 30 is set in the third position P3, the locking member 40 is threaded into the locating hole 261 with the distal end thereof stopped against the first bearing surface 37 of the first engaging portion 35 of the fence unit 30, forcing the first engaging portion 35 of the fence unit 30 to abut against the first upright wall 24 of the mounting base 20 firmly.

Thus, when the user sets the fence unit 30 in the first position P1, as illustrated in FIG. 5, the first abutting surface 29 of the mounting base 20 and the second abutting surface 32 of the fence unit 30 provide positive support to the workpiece. At this time, the saw arm maintains its original cutting stroke S1.

When the user turns the fence unit 30 through an angle of 90 degrees from the first position P1 to the second position P2 and locks the fence unit 30 in position, as shown in FIG. 6, a gap is left between the third abutting surface 33 of the fence unit 30 and the first abutting surface 29 of the mounting base 20. The presence of this gap causes the cutting stroke of the saw arm to be changed from S1 to S2 (see FIG. 6). Further, after the fence unit 30 is turned through an angle of 90 degrees, an elevational, e.g., height, difference is produced between the third abutting surface 33 of the fence unit 30 and the first abutting surface 29 of the mounting base 20 due to the positioning of the first engaging portion 35 of the fence unit 30. In order to maintain cutting stability, the user can place a raiser block 50 on the first work surface 18 of the supporting base 16 to abut the raiser block 50 against the first engaging portion 35 of the fence unit 30 and to keep a top surface of the raiser block 50 flush with the first bearing surface 37 of the first engaging portion 35 of the fence unit 30, and then place the workpiece on the top surface of the raiser block 50, enabling the workpiece to be supported by or against the third abutting surface 33 of the fence unit 30 in position. This arrangement is practical for cutting a relatively thinner workpiece.

When the user turns the fence unit 30 through an angle of 180 degrees from the first position P1 to the third position P3 and locks the fence unit 30 in position, as shown in FIG. 4 and FIG. 7, a gap is left between the fourth abutting surface 34 of the fence unit 30 and the first abutting surface 29 of the mounting base 20 due to the non-coplanar relationship. The presence of this gap causes the cutting stroke of the saw arm to be changed from S1 to S3. Further, after the fence unit 30 is turned through an angle of 180 degrees, an elevational, or height, difference is produced between the fourth abutting surface 34 of the fence unit 30 and the first abutting surface 29 of the mounting base 20 due to the positioning of the second engaging portion 36 of the fence unit 30. In order to maintain cutting stability, the user can place another raiser block 52 on the first work surface 18 of the supporting base 16 to abut the raiser block 52 against the second engaging portion 36 of the fence unit 30 and to keep a top surface of the raiser block 52 in flush with the second bearing surface 38 of the second engaging portion 36 of the fence unit 30, and then place the workpiece on the top surface of the raiser block 52, enabling the workpiece to be supported by or against the fourth abutting surface 34 of the fence unit 30 in position. This arrangement is practical for cutting a relatively thicker workpiece.

In conclusion, the fence assembly 10 of the present invention allows adjustment of each position of the fence unit 30 according to the actual cutting requirements for the workpiece so that the cutting stroke of the saw arm can be relatively adjusted, and thus, the design of the present invention solves of the problem of limited cutting stroke of the prior art designs.

What is claimed is:

1. A fence assembly used in a miter saw comprising a supporting base and a worktable rotatably supported on said supporting base, said supporting base defining a first work surface, said worktable defining a second work surface, the fence assembly comprising:

a mounting base that is able to be mounted on said supporting base, said mounting base comprising a first abutting surface that extends perpendicular to said first work surface of said supporting base when mounted; and at least one fence unit that is able to be detachably mounted on said mounting base and turnable relative to said mounting base between a first position, a second position and a third position, each of said fence unit of the at least one fence unit comprising a second abutting surface, a third abutting surface that extends perpendicular to said second abutting surface and a fourth abutting surface located on a back side of said second abutting surface, wherein said second abutting surface is disposed perpendicular to said first work surface of said supporting base and coplanar with said first abutting surface of said mounting base when the respective said fence unit is set in said first position, said third abutting surface is disposed perpendicular to said first work surface of said supporting base and in a non-coplanar relationship with said first abutting surface of said mounting base when the respective said fence unit is set in said second position, and said fourth abutting surface is disposed in a non-coplanar relationship with said first abutting surface of said mounting base to face toward the direction toward which said first abutting surface of said mounting base faces when the respective said fence unit is set in said third position, wherein said mounting base further comprises a mounting part, said mounting part comprising a bottom wall, a first upright wall and a second upright wall, said first upright wall and said second upright wall being respectively connected to said bottom wall and defining with said bottom wall a retaining groove therebetween, said first upright wall forming said first abutting surface; each said fence unit further comprises an abutment portion, a first engaging portion and a second engaging portion, said abutment portion forming said second abutting surface on a front side thereof, said third abutting surface on a bottom side thereof and said fourth abutting surface on a back side thereof, said first engaging portion being connected to the bottom side of said abutment portion, said second engaging portion being connected to the back side of said abutment portion and disposed perpendicular to said first engaging portion, said first engaging portion being able to be engaged into said retaining groove of said mounting base when the respective said fence unit is set in said first position, said second engaging portion being able to be engaged into said retaining groove of said mounting base when the respective said fence unit is set in said second position, said first engaging portion being able to be engaged into said retaining groove of said mounting base when the respective said fence unit is set in said third position.

2. The fence assembly as claimed in claim 1, wherein said mounting base comprises at least one locating hole located on said second upright wall, and a locking member that is able to be mounted in each said locating hole to lock said fence unit in position, said locking member being fastened to one respective said locating hole with a distal end thereof stopped against said first engaging portion of one respective said fence unit when the respective said fence unit is set in said first position, said locking member being fastened to one respective said locating hole with the distal end thereof stopped against said second engaging portion of one respective said fence unit when the respective said fence unit is set in said second position, said locking member being fastened to one respective said locating hole with the distal end thereof stopped against said first engaging portion of one respective said fence unit when the respective said fence unit is set in said third position.

3. The fence assembly as claimed in claim 1, wherein said first engaging portion of each said fence unit comprises a first bearing surface perpendicularly connected to said third abutting surface of the associated said abutment portion.

4. The fence assembly as claimed in claim 3, further comprising a raiser block, said raiser block being able to be placed on said first work surface of said supporting base and able to be abutted against said first engaging portion of each said fence unit with a top surface of the raiser block kept flush with said first bearing surface of said first engaging portion of each said fence unit when said at least one fence unit is set in said second position.

5. The fence assembly as claimed in claim 1, wherein said second engaging portion of each said fence unit defines a second bearing surface perpendicularly connected to said fourth abutting surface of the associating said abutment portion.

6. The fence assembly as claimed in claim 5, further comprising a raiser block, said raiser block being able to be placed on said first work surface of said supporting base and able to be abutted against said second engaging portion of each said fence unit with a top surface of the raiser block kept flush with said second bearing surface of said second engaging portion of each said fence unit when said at least one fence unit is set in said third position.

* * * * *